US006738477B1

(12) United States Patent
Kam

(10) Patent No.: US 6,738,477 B1
(45) Date of Patent: May 18, 2004

(54) MOUNTING SYSTEM FOR PORTABLE TELEPHONE

(75) Inventor: Richard Kam, Yuen Long (HK)

(73) Assignee: Nokia Mobile Phones Ltd., Espoo (FI)

( * ) Notice: Subject to any disclaimer, the term of this patent is extended or adjusted under 35 U.S.C. 154(b) by 395 days.

(21) Appl. No.: 09/595,968

(22) Filed: Jun. 19, 2000

(51) Int. Cl.[7] .............................................. H04M 1/00
(52) U.S. Cl. ...................................... 379/446; 379/455
(58) Field of Search ................................ 379/446, 454, 379/455; 248/221.3, 221.4, 309.1

(56) References Cited

U.S. PATENT DOCUMENTS

| 4,957,264 A | 9/1990 | Hakanen ..................... 248/510 |
| 5,016,851 A | 5/1991 | Koskinen et al. ........... 248/278 |
| 5,040,712 A | 8/1991 | Pesonen et al. ....... 224/42.45 R |
| 5,121,863 A | 6/1992 | Kotitalo et al. ....... 224/42.45 R |
| 5,189,698 A | 2/1993 | Hakanen ..................... 379/455 |
| 5,480,115 A * | 1/1996 | Haltof ........................ 379/455 |
| 5,597,102 A | 1/1997 | Saarikko et al. ............. 224/197 |
| 5,708,707 A | 1/1998 | Halttunen et al. ........... 379/446 |
| 5,825,874 A | 10/1998 | Humphreys et al. ........ 379/446 |
| 5,828,750 A | 10/1998 | Perala ....................... 379/446 |
| 6,185,302 B1 * | 2/2001 | Rytkonen et al. ........... 379/446 |

FOREIGN PATENT DOCUMENTS

| EP | 0 585 011 A1 | 3/1994 |
| FI | 89650 | 7/1993 |
| FI | 99253 | 9/1997 |
| GB | 2 293 718 A | 4/1996 |

* cited by examiner

*Primary Examiner*—Jack Chiang
(74) *Attorney, Agent, or Firm*—Perman & Green, LLP

(57) ABSTRACT

A holder having a locking mechanism for a telephone. The holder includes a single piece integral structure forming a combined pushing/locking element that is adapted to act as both a pushing element pushing against a rear portion of the telephone and also as a simultaneous locking element for locking the telephone to the holder whereby as the rear portion of the telephone pushes against the pushing element portion of the single piece pushing/locking element, the locking element portion of the single piece pushing/locking element substantially simultaneously is pushed inwards towards the phone thereby locking the phone in the holder.

29 Claims, 8 Drawing Sheets

MOUNTING SYSTEM FOR PORTABLE TELEPHONE

BACKGROUND OF THE INVENTION

1. Field of the Invention

The invention is generally related to electronic devices such as mobile phones, and particularly to a bracket for removably holding the phone, the bracket including a fixing means for securely holding the device in the bracket. The invention can be used, for example, in fixing a mobile phone to an inside surface of a automobile. More specifically, this invention relates to a passive telephone holder with a single piece pushing/locking mechanism adapted to interact with the back surface of the telephone battery cover to secure a telephone firmly in place in the holder.

2. Description of the Prior Art

The total number of cordless phones, personal handy phone systems and mobile telephones in general use worldwide is rapidly increasing. Since a large percentage of these telephones are used within automobiles or other moving vehicles while the user is driving, many of these devices have been provided with means to attach these devices to an appropriate position in a vehicle compartment in order to hold the mobile telephone securely while the vehicle is moving thereby permitting a driver or passenger to easily and safely use the phone. One particular safety aspect of the use of these phones in moving vehicles concerns the question of how to easily place and carry the mobile phone securely in a holder within the vehicle, while at the same time allowing the user easy access to remove the phone from the holder and use it.

From the users point of view it desirable that a mobile phone be securely held in the mobile phone holder during driving, and also be conveniently, easily, and quickly detachable from the holder with one hand, permitting the user to operate the vehicle with the other. The mobile telephone should also be easily and quickly and securely replaceable back into the holder with one hand, when the user is finished using the mobile telephone. Additionally, from the design point of view, it would be an added advantage if the telephone also uses a battery that does not require special exterior flat surfaces. From the manufacturer's point of view, it is further desirable that the phone holder be capable of providing all these advantages and at the same time be light weight and simple in construction, generally allow the industrial designer more freedom for styling the telephone, and also permit the phone designers to design telephones having additional inside space.

Presently existing mobile telephone holders may offer one or more of the above listed advantages, but they simply do not provide all of the above advantages together in a mobile telephone holder. It would definitely lead to a unique situation if all the above described advantages could be obtained in the same product.

EP0545670B1 illustrates a design for a telephone holder including a cradle portion formed to receive al telephone; a mounting portion; the cradle portion being movably mounted on the mounting portion; and retaining means that exerts a retaining force on a telephone. The disclosed design for a telephone holder does not include release buttons nor a mechanism for pushing away thee telephone. It appears that releasing the telephone from its holder takes place by simply pulling the telephone. In the present invention in order to release a locked telephone, a user has to push a release button associated with the car holder.

U.S. Pat. No. 5,825,874 illustrates a mobile telephone holder having a frame and a combined latching and ejecting mechanism. Due to the simplicity of the mechanism disclosed, there is no linkage between the two illustrated release buttons on the telephone holder. As a result, users have to press both buttons simultaneously, to release both side locks of the phone, thereby completely unlocking the phone from the holder. Another example of a known telephone car holder is given in U.S. Pat. No. 5,907,796.

Another known telephone holder usable in a car is disclosed in U.S. patent application Ser. No. 09/189,614, filed Nov. 9, 1998 and assigned to Nokia. The application describes a telephone holder, especially a holder installable on a car in which a phone is kept during driving. The holder has an enclosed structure and it comprises a cup-like inner shell part, an outer shell part and a locking element fitted in the cavity between the shell parts and movable with respect to the shell parts, a thrust block and locking claw in the locking element being located in a hole formed in the inner shell part. The phone is locked into the holder with a turning movement wherein the phone pushes the thrust block and at the same time a guiding surface in the outer shell part wedges the locking claw into a hollow on the side of the phone. The pushing movement is directed against the end of a double torsion spring in the holder so that the middle part of the spring turns a shaft and thus locks the locking element into the locked position. The phone is released from the locked position by pressing the shaft by means of a push lever wherein the locking element is freed from a catch and the end of the process returns the phone to the initial position so that it can be removed from the holder.

Unlike the telephone holders described by the prior art, the present invention is for a very unique structure for a telephone which simply makes use of the back surface of the phone battery instead of special side features for interaction between the phone and the car holder mechanism. With the features of the present invention, there is no need to make any special exterior flat surface at the two sides of the battery. The car holder simply interacts with the back surface of the phone battery for activating the holder mechanism. There is no known telephone holder that interacts with the rear surface of the phone battery for activating the phone holder mechanism in order to lock the phone, while the phone is turning about a pivot point in the holder.

Without the need to reserve special exterior flat surface at the two sides of the phone battery, industrial designers have larger degrees of freedom in product design, while mechanical designers can get more useable space inside the phone. The assembly of the car phone holder mechanism is also simplified and overall assembly time is reduced, thereby reducing the overall manufacturing costs associated with a phone holder.

SUMMARY OF THE INVENTION

The present invention relates to a holder with a locking mechanism for a telephone, the holder further including a single piece pushing/locking element that is adapted to act as both (i) a pushing element pushing against a rear portion of the telephone, and (ii) a locking element for locking the telephone to the holder, whereby as the rear portion of the telephone pushes against the pushing element portion of the single piece pushing/locking element the locking element portion of the single piece pushing/locking element substantially simultaneously is pushed inwards towards the phone thereby locking the phone in the holder with locking hooks located at the end portions thereof.

The present invention also features a locking mechanism which includes a locking element (i.e. one portion of the pushing/locking element) which, due to it being part of a single piece mechanism, i.e. the "single piece" feature, it can in addition to its locking feature, push away the phone from the holder and/or be activated by the phone by pushing against the backside of the phone battery. Since the locking element is part of a single piece part which includes a pushing feature as described below, it also helps reduce the assembly lead-time for the holder structure, thereby reducing overall manufacturing costs.

Furthermore, in accordance with the features of the present invention, in order to activate the single piece pushing/locking element, a push button mechanism and slider system is featured whereas when at least one of the push-buttons is pushed inwardly, the slider system is consequently brought to a position that it releases the locking element of the single piece pushing/locking element thereby unlocking the phone from the phone holder while at the same time all push buttons automatically move in an inward direction.

BRIEF DESCRIPTION OF THE DRAWINGS

The invention will now be described in more detail by means of an example and accompanying drawings which are incorporated in and constitute a part of the specification, and which illustrate one embodiment of the invention and also, together with the description, serve to explain the principles of the present invention, wherein.

DETAILED DESCRIPTION OF THE PREFERRED EMBODIMENT

The features of the present invention are best explained with regard to a mobile telephone or phone, and a phone holder which is designed to be installed in a car in such a manner so that the phone can be easily and safely reached and used by the driver of the car while driving the car. In accordance with the features of the present invention, the phone can be inserted in the holder and locked into it with a simple move of one hand. The removal of the phone from the holder is accomplished by the simple pressing of a push-button located on the holder also by the use of one hand.

Figure 1:
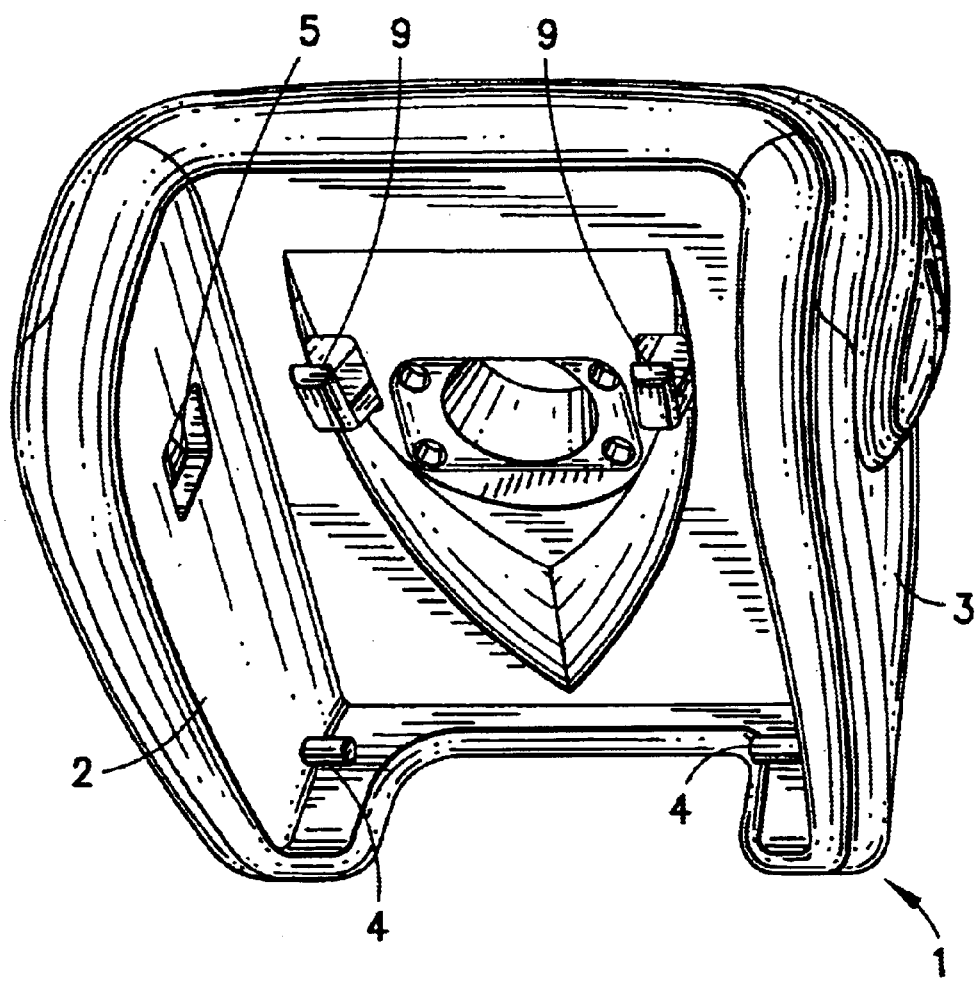
FIG. 1 illustrates a perspective view of a car telephone holder in accordance with the features of the present invention, the holder being in an "unlocked" position vis-à-vis the phone.
Figure 2:
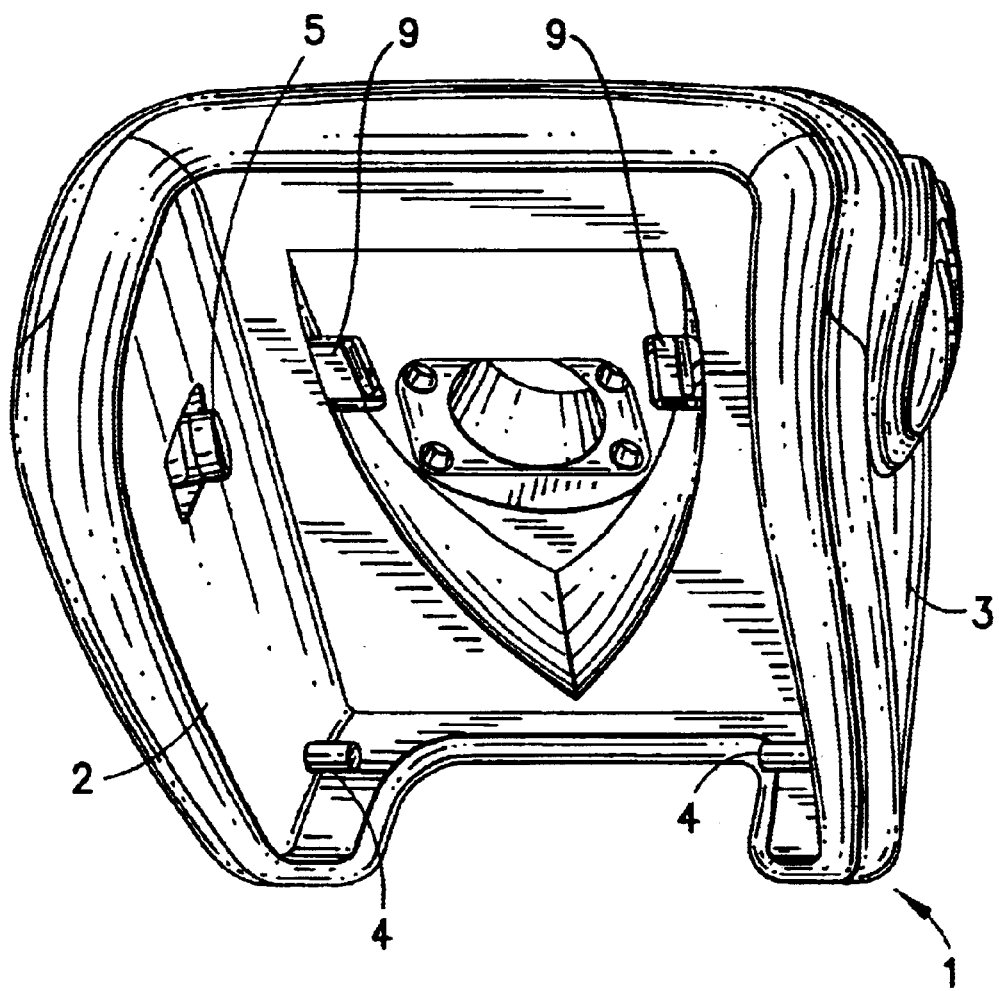
FIG. 2 illustrates a perspective view of a car telephone holder in accordance with the features of the present invention, the holder being in a "locked" position vis-à-vis the phone.

The holder 1 which can best be seen in FIGS. 1 and 2, comprises mainly a stationary piece that includes a cup-like inner shell part 2 and against that an outer shell part 3, which defines between them a cavity in the holder. In use in accordance with that shown in FIG. 1, a phone (not shown) is inserted into the holder 1 by first fitting a notch (not shown) located on the bottom part of the phone onto the pivots 4 located on the opposing sides of holder 1. At this juncture, locking hooks 5 or that which can also be referred togas locking latches which are part of and located at the end portions of a locking element positioned on each end portion of the single piece pushing/locking element are in an unlocked position with regard to a phone located within holder 1. As more clearly shown in FIG. 3, when a phone 7 is first positioned in holder 1, the back surface 8 of the phone battery presses against each spring type pusher element 9. As pressure is applied on the phone in such a manner that pushes each spring type pushing element 9 inwardly, phone battery back surface 8 eventually lies in substantially contiguous relationship with the inner surface of holder 1 as shown more clearly in FIG. 4. In this position the locking hooks 5 lock the phone to the holder and thereby places the phone in a locked position as illustrated in FIG. 4.

Figure 5:
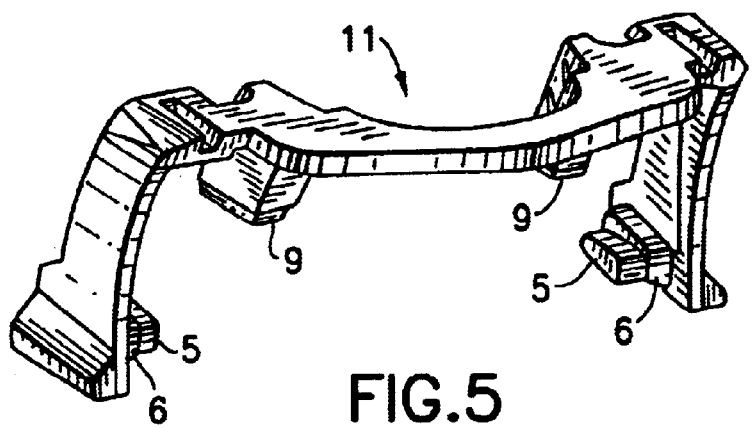
FIG. 5 illustrates a perspective view of a single piece pushing/locking element in accordance with the features of the present invention.

The single piece pushing/locking element employed in holder 1, as described in this invention and as specifically shown in FIG. 5 is constructed such that each pushing element 9 is spaced a relatively considerable distance from each locking element 6. In fact, it is a preferred construction in accordance with the features of the present invention that each pushing element 9 is positioned at a middle portion of the single piece pushing/locking element 11 and each of the locking elements 6 is positioned at each end portion of the pushing/locking element. To avoid issues that can be raised due to this construction feature, the present invention includes employing a pusher/locking element which is formed of a single integral piece of material. As more clearly shown in FIG. 5, the single piece pusher/locking element 11 acts as a pusher against the backside of a phone via pushing elements 9, and on the other hand and at the same time (i.e. simultaneously) also acts as an activator for triggering the engagement of the locking hooks with the phone, the hooks being positioned on the end portions of each locking element.

Figure 6:
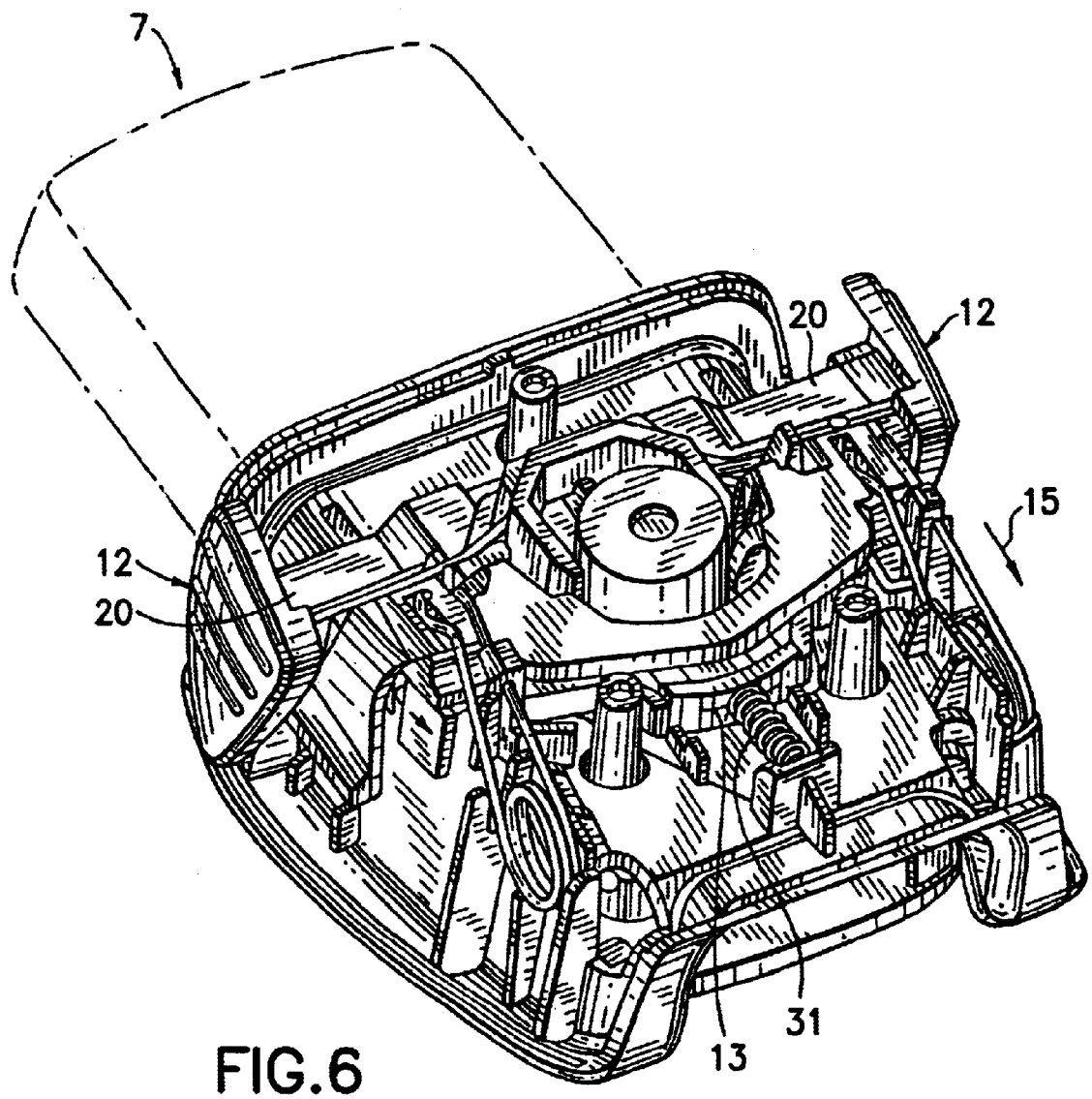
FIG. 6 illustrates a perspective view oft the inside mechanism of a car telephone holder with a phone in place in accordance with the features of the present invention, specifically illustrating push buttons, a slider mechanism and a single piece pushing/locking element.
Figure 7:
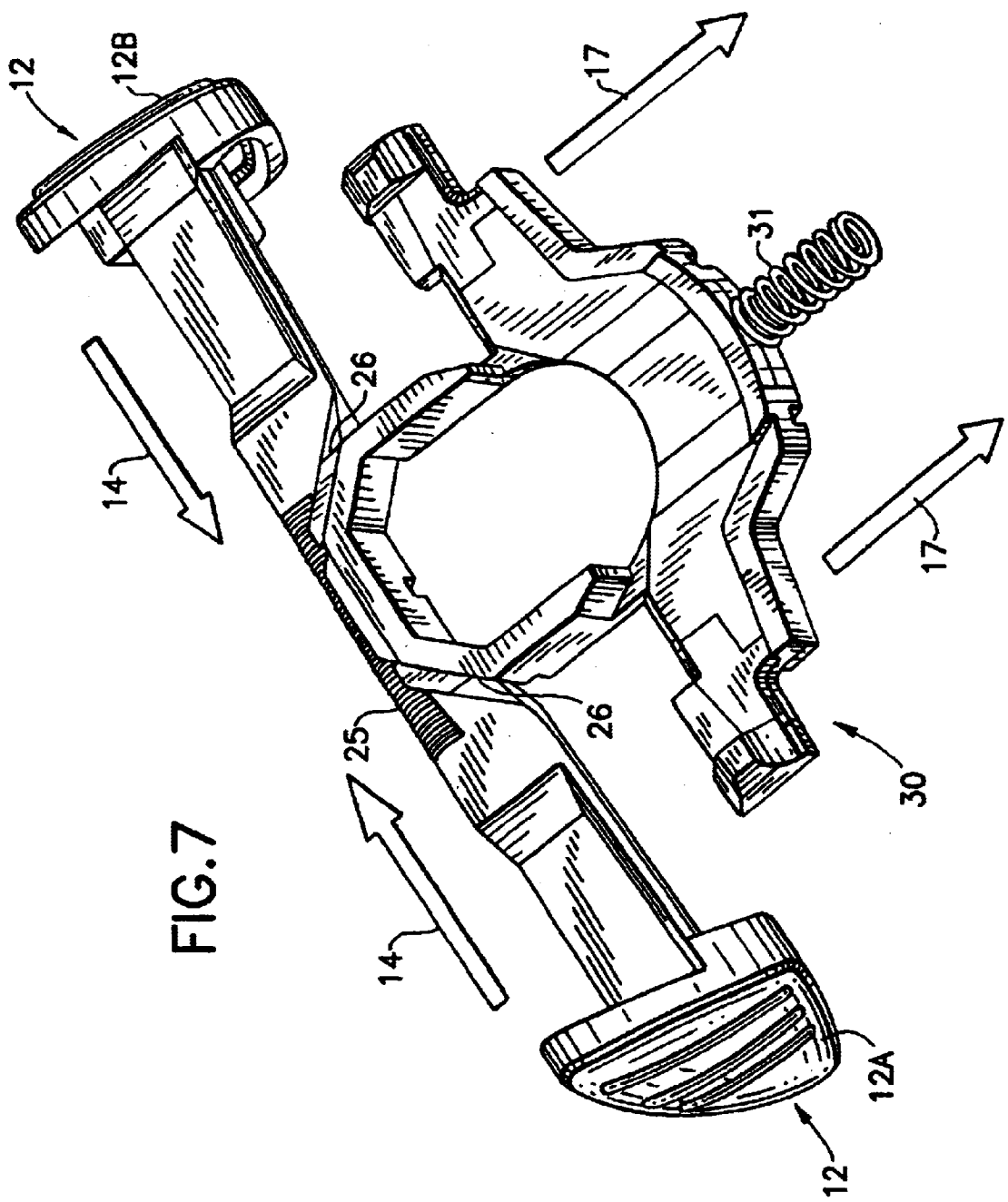
FIG. 7 illustrates a perspective view of the push-button and slider mechanism used in the car telephone holder in accordance with the features of the present invention.
Figure 8:
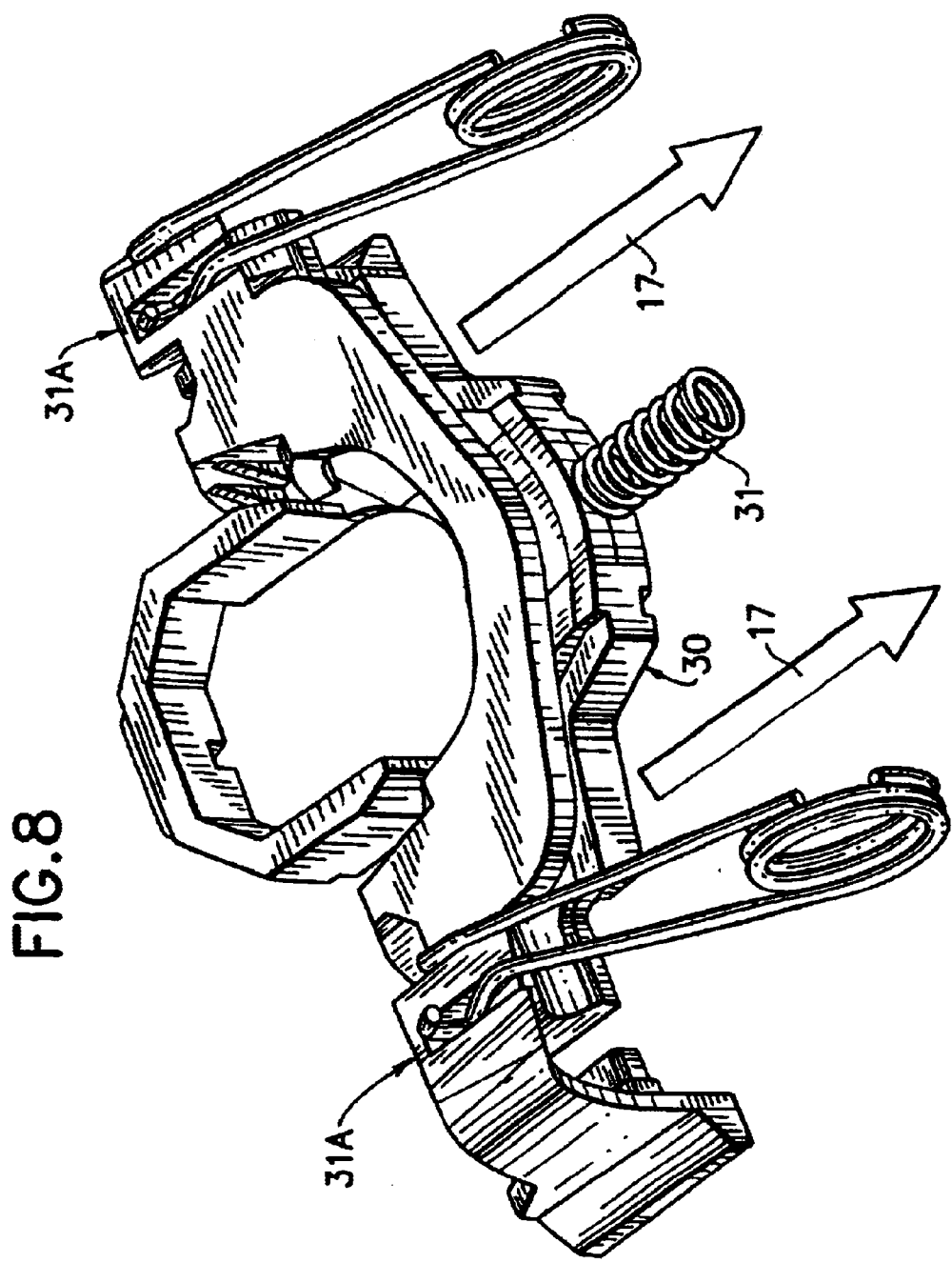
FIG. 8 illustrates a perspective view of a slider mechanism and a single piece pushing/locking element as used in a car telephone holder in accordance with the features of the present invention, the slider being in a position to place the phone in an "locked" position.

As illustrated in FIGS. 6, 7 and 8, the movement of the push buttons 12 are governed by ribs (not shown) that guide movement of the buttons such that the movement of push buttons 12 is limited to an inward and outward movement along the direction 14 as specifically shown in FIG. 7. The spring 25 positioned between the push buttons 12 is a tensile spring that provides a relatively weak tensile spring force that pulls the two buttons 12 together inwardly.

The movement of the slider mechanism 30 as illustrated in FIGS. 6, 7 and 8 is governed by a plurality of guiding ribs (not shown) such that movement of the slider mechanism is limited to a back and forth movement along the direction 17 as illustrated in FIGS. 7 and 8. Positioned at the rear end portion of the slider mechanism is a compression spring 31 that provides a relatively strong spring force pushing the slider mechanism in a forward direction. As more clearly illustrated in FIG. 7 that explains why only one push button 12 is required to be pushed to activate slider mechanism 30. As clearly illustrated in FIG. 7, when a push button 12 is pushed in an inward direction (i.e. the direction of arrows 14), the slider mechanism moves in a backward direction 17, the movement being governed by the slider mechanisms guiding ribs (not shown) pushing against the compression spring force of spring 31. At the same time that one of the push buttons 12A is pushed in an inward direction, the other push button 12B moves in an inward direction. This is automatically driven by the force of tensile spring 25. The movement of the buttons 12 is governed by its guiding ribs (not shown).

Figure 8A:
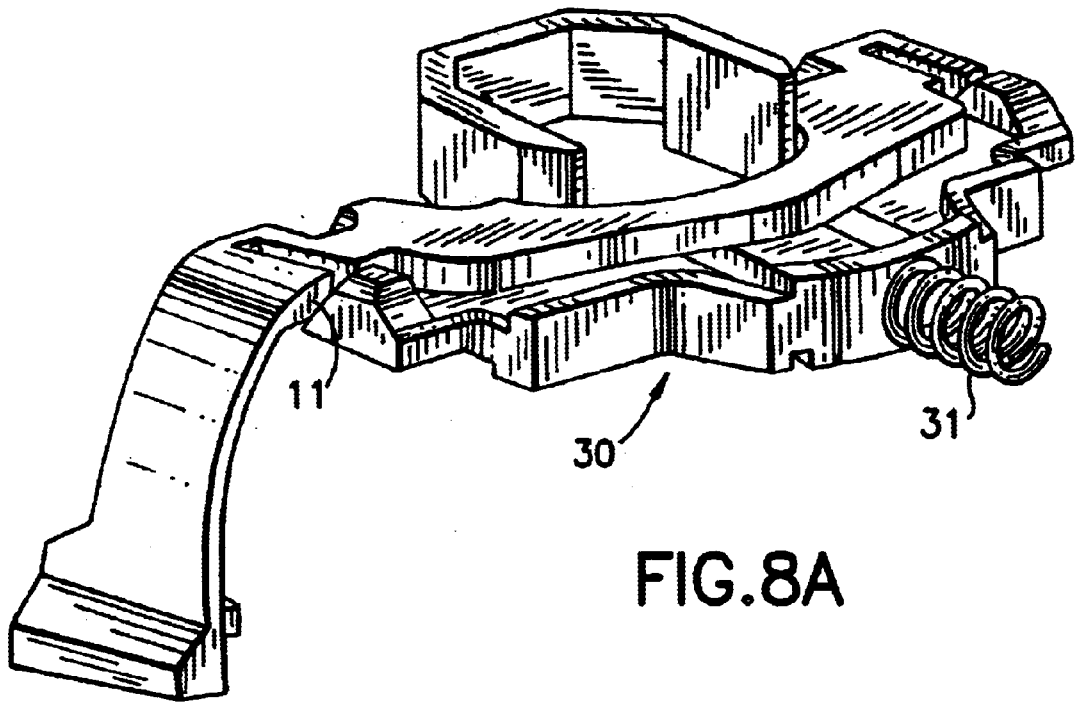
FIG. 8A is a perspective view illustrating the single piece pusher/locking element used in a car telephone holder in such a position that blocks the return of the slider mechanism in accordance with the features of the present invention and places the phone in an "unlocked" position.

In FIG. 8A, there is illustrated the slider mechanism 30 that has moved a sufficient amount in a backward direction so that it releases the single piece pushing/locking element 11. Governed by some guiding ribs (not shown), the single piece pushing/locking element 11 can move up and down only. Movement of the slider mechanism 30 results in the release of the single piece pushing/locking element 11 such that the locking hooks positioned on each end portion of the locking elements of the single piece pushing/locking element can start moving downwards, governed by the guiding ribs and driven by the spring force 31 A on the shoulder portions of the single piece pushing/locking element, as shown in FIG. 3A and FIG. 8.

Figure 3:
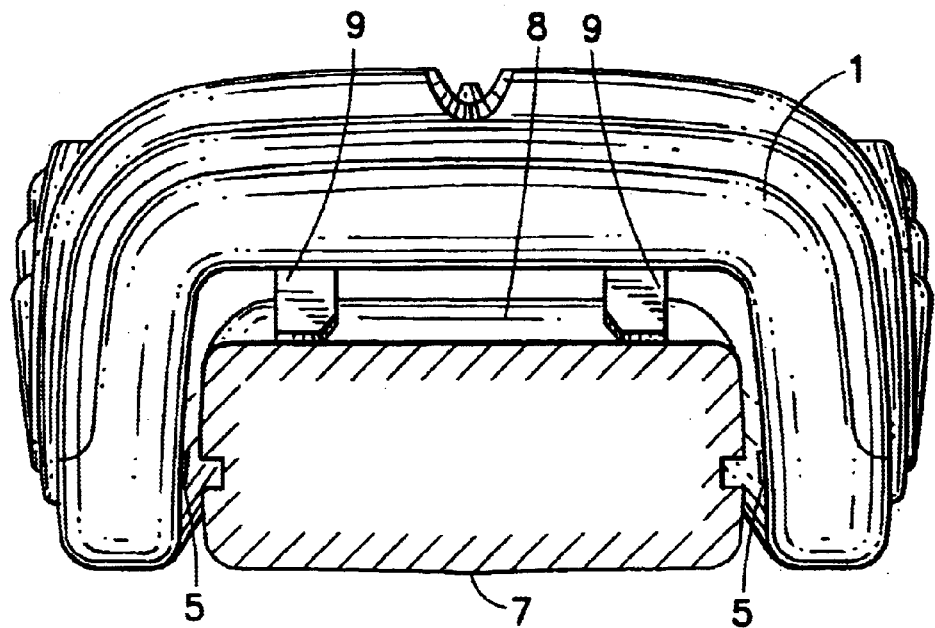
FIG. 3 illustrates a cross sectional view of a car telephone holder with a phone in place in accordance with the features of the present invention, the phone being in an "unlocked" position.
Figure 3A:
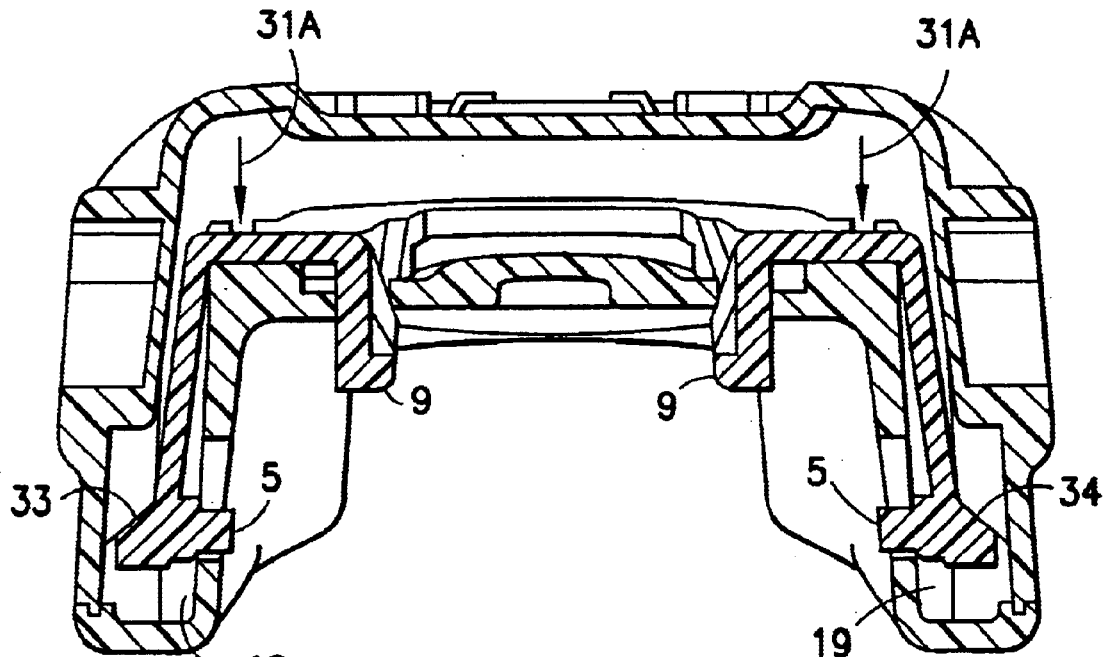
FIG. 3A illustrates another cross sectional view of a car telephone holder in accordance with the features of the present invention the phone being in an "unlocked" position.

Once the locking elements with locking hooks has reached its most downward possible position, (see FIGS. 3 and 3A) then the following features occur:

(i) as shown in FIG. 3A the two hooks 5 are in an open position due to existence of two lower ribs 18 and 19 with angled top surfaces.

Figure 4:
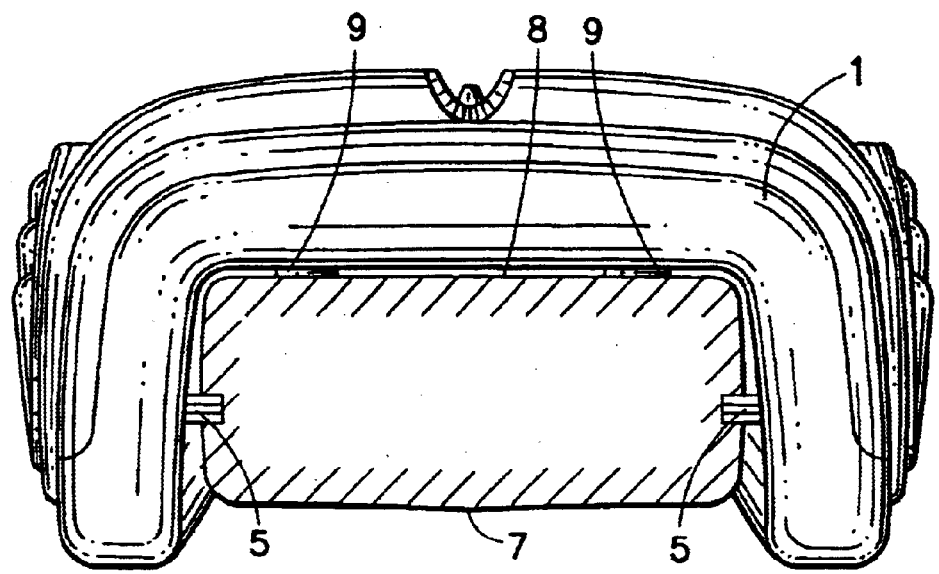
FIG. 4 illustrates a cross sectional view of a car telephone holder with a phone in place in accordance with the features of the present invention, the phone being in the "locked" position.

(ii) When the hooks 5 are in an open position this causes the release of the phone as shown in FIG. 3.

(iii) In this position of the slider mechanism 30, the single piece pushing/locking element blocks the way so that the slider mechanism 30 cannot return to its forward initial position, even though there exits a relatively strong compressive spring force behind it due to spring member 31 as shown in FIG. 8A.

Figure 4A:
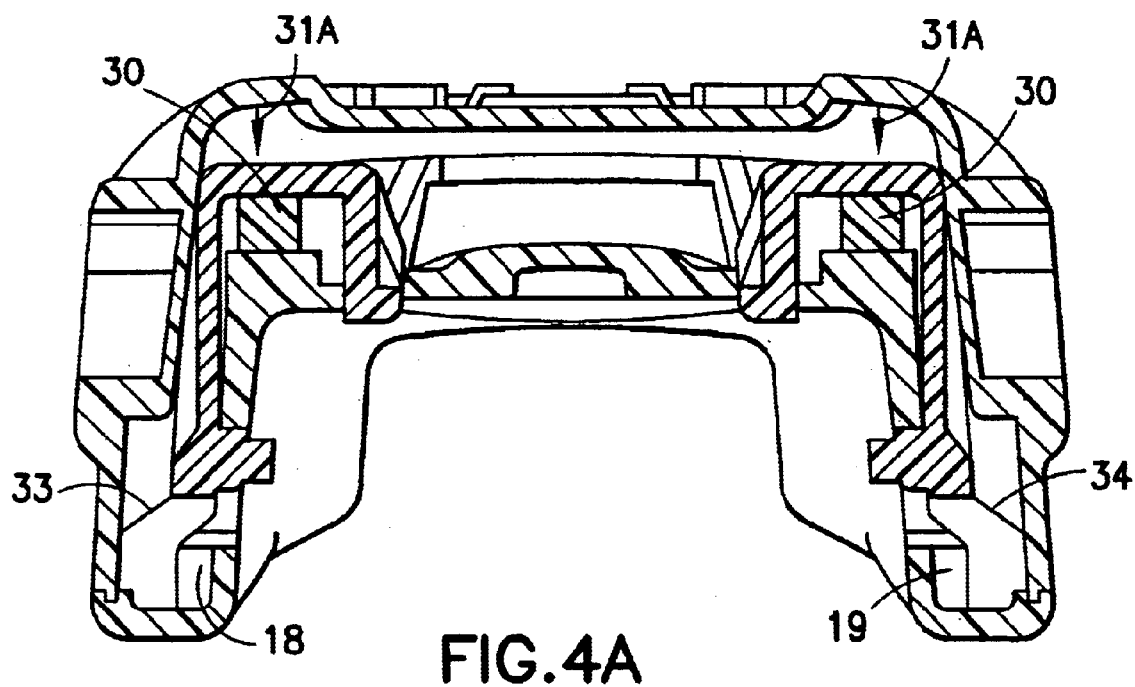
FIG. 4A illustrates another cross sectional view of the car telephone holder in accordance with the features of the present invention in a "locked" position.

At this juncture the sliding mechanism is in the stable unlocked portion. The mechanism for now locking the telephone in the holder is as follows:

As previously described, to lock the phone in the holder, the phone is placed in the holder such that the phone battery surface exerts a pushing force on the spring type pushing element portion of the single piece pushing/locking element. Once the locking hooks 5 have been pushed to their uppermost portion by inserting the phone into the holder and pushing against the spring type pusher elements 9 as illustrated in FIGS. 4 and 4A then:

(i) as illustrated in FIG. 4A, the two hook elements 5 are directed to a closed position to lock the phone in the holder by the slider mechanism 30 causing the movement of upper ribs 33 and 34 which hare pushing against surfaces 41 and 42 of the shingle piece pushing/locking element as illustrated in FIG. 5.

(ii) As illustrated in FIG. 4 the phone 7 is now locked in the holder.

Figure 8B:
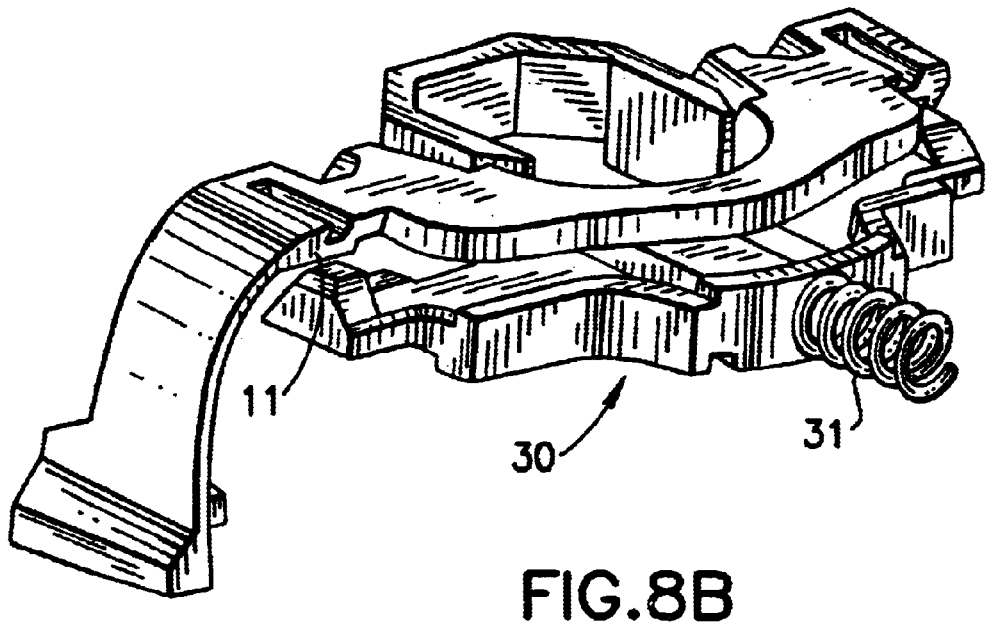
FIG. 8B is a perspective view illustrating the single piece pusher/locking element used in a car telephone holder in such a position that it does not block the slider mechanism from returning to the "home" position in accordance with the features of the present invention.

(iii) The single piece pushing/locking element 11 no longer blocks the path of the slider mechanism 30 (see FIG. 8B).

(iv) The slider mechanism 30 then moves in a forward direction governed by its guiding ribs and driven by the relatively strong compressive spring force behind it.

(v) the push buttons 12 move outward as the slider mechanism moves in a forward direction (i.e., they move in opposite moving directions to the arrows 14 as illustrated in FIG. 7). The tensile spring force due to spring 25 in between the push buttons 12 is substantially weaker than the compressive spring force due to spring 31 that forces the slider mechanism in a forward direction. Basically, the button tensile spring 25 is primarily able to provide a linkage between the two buttons 12.

(vi) Eventually, the slider mechanism returns to the initial position (home position) as illustrated in FIG. 8 and FIG. 4A.

(vii) At this juncture, the slider mechanism blocks the path that the single piece pushing/locking element 11 can move in a generally downward direction even though there exists downwardly pushing spring forces 31A on the shoulder portions of the single piece pushing/locking element 11 (note FIGS. 8 and 4A).

(viii) The locking elements along with their locking hooks can now only remain in its uppermost position. It is locked along with the telephone. At this juncture the entire mechanism is in a stable locked position.

(ix) The next step would be to unlock the phone, and to start the process over again (as described above). To do this one would simply push at least one push button 12 in an inward direction with ones finger.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A telephone holder comprising: a single piece integral structure forming a combined pushing/locking element, said pushing/locking element being adapted to act as both a pushing element pushing against a rear portion of a telephone and as a locking element for locking said telephone to said holder, the pushing element comprising at least one pushing element member extending through a corresponding opening in a rear surface of said holder and being spaced a distance from said locking element, whereby as said rear portion of said telephone pushes against said at least one pushing element member of said single piece pushing/locking element, said locking element portion of said single piece pushing/locking element substantially simultaneously is pushed inwards through a separate, corresponding opening in said holder towards said phone thereby locking said phone in said holder, wherein the holder is stationary relative to the phone and the phone pivots, on at least one pivot member along a bottom portion of the phone, into the holder.

2. A telephone holder according to claim 1 wherein said pushing element is positioned at a middle portion of said single piece pushing/locking element and said locking element is positioned at each end portion of said pushing/locking element.

3. A telephone holder according to claim 1 wherein said pushing element pushes against a battery positioned within said phone.

4. A telephone holder according to claim 1 wherein each locking element includes a locking hook integrated therewith.

5. A telephone holder according to claim 4 wherein each locking hook is positioned at the end portion of each locking element, said locking hook being adapted to lock said telephone in said holder.

6. A telephone holder according to claim 5 wherein each of said locking hooks are in their uppermost position to lock said telephone to said holder.

7. A telephone holder according to claim 1 further comprising a system for activating said single piece pushing/locking element comprising at least one button and a slider mechanism said system adapted to release said locking element when at least one button is pressed.

8. A telephone holder according to claim 7 wherein only one button needs to be pushed to release a locked phone.

9. A telephone holder according to claim 7 wherein said single piece pushing/locking element is adapted to prevent movement of said slider mechanism.

10. A telephone holder according to claim 7 wherein said slider mechanism is driven by a spring type force.

11. A telephone holder according to claim 7 wherein said telephone is locked in position within said holder and said single piece pushing/locking element does not block the path of said slider mechanism.

12. A telephone holder according to claim 7 wherein said push buttons are positioned by a tensile spring force weaker than the compressive spring force which positions said slider mechanism.

13. A telephone holder according to claim 7 wherein said slider mechanism is positioned to block the path of movement of said single piece pushing/locking element.

14. A single piece pushing/locking element for use in a telephone holding device, said single piece element adapted to act as both a mechanism to push said telephone out of said holder and a mechanism to lock said telephone in said holder, comprising a single piece structure including flexible locking elements positioned it each end portion of said single piece element and flexible pushing members positioned at the middle portion of said single piece element the pushing members separated from and oriented substantially perpendicular to the pushing/locking element, wherein as a phone is inserted into the holding device the pushing member exerts a force on the pushing/locking element and the locking elements move inwards to engage a respective side of the phone to lock the phone in the holding device.

15. The telephone holder of claim 1 wherein the pushing/locking element is located in a cavity between an inner shell part and an outer shell part of the holder.

16. The telephone holder of claim 1 wherein the at least one pushing element member is pushed into the corresponding opening while the locking element portion moves into a recess in the phone.

17. The telephone holder of claim 1 wherein when the telephone is locked in the holder, the rear portion of the phone is flush with a corresponding inner portion of the holder, the holder being stationary relative to the pushing/locking element.

18. The telephone holder of claim 1 wherein the pushing element includes two members, each member oriented substantially perpendicular to the pushing/locking element and spaced apart from one another.

19. The telephone holder of claim 18 wherein each member is spaced apart from the nearest locking element portion.

20. The telephone holder of claim 1 further comprising:
a push button on either side of the holder and a tensile spring member linking the two buttons; and
a slider mechanism biased by a compression spring against the tensile spring member the slide mechanism adapted to retain the pushing/locking mechanism in a locked position when the telephone is inserted into the holder, wherein when one of the push buttons is pressed inward, the slider mechanism is caused to move away from the tensile spring and the pushing/locking element is released from the locked position.

21. The telephone holder of claim 20, wherein when the pushing/locking element is released from the locked position, the pushing/locking element blocks the slider mechanism from returning to its initial position until the pushing element member is pushed by the telephone.

22. A telephone holder comprising:
an outer shell part and a cup like inner shell part defining a cavity between the outer and inner shell part;

a single piece pushing/locking element in the cavity having at least one pusher element extending through a corresponding opening along a rear portion of the inner shell, the at least one pusher element adapted to engage a portion of a rear surface of a phone inserted into the holder;

a locking element at each end of the single piece pushing/locking element, each locking element adapted to extend through a corresponding opening along a side surface of the inner shell part that is separate from and substantially orthogonal to the opening along the rear portion of the inner shell, the locking element adapted to lock the phone to the holder when the phone is pressed against the at least one pusher element.

23. The telephone holder of claim 22 wherein when the phone is in a locked position, the rear surface of the phone lies in a substantially contiguous relationship with the inner surface of the holder.

24. The telephone holder of claim 22 further comprising a push button on either side of the outer shell of the holder and a tensile spring linking each push button, wherein when one push button is pressed inwardly, the phone in the holder is released from a locked position.

25. The telephone holder of claim 24 further comprising a slider mechanism having a compression spring at a rear end portion of the slider mechanism, the compression spring biasing the slider mechanism against the tensile spring, the slider mechanism blocking movement of the pushing/locking element when the phone is locked in the holder by the pushing/locking element.

26. The telephone holder of claim 25 wherein when the push button is pressed, the slide mechanism is moved in a direction to release the pushing/locking element from a locked position and unlock the phone from the holder, wherein when released position, the pushing/locking element prevents the slider mechanism from returning to the locked position until the pusher element is pressed by a phone inserted into the holder.

27. The telephone holder of claim 1 wherein the pushing element member moves along a substantially horizontal plane as the telephone presses against the pushing element member.

28. The telephone holder of claim 1 wherein the pushing element member is in a substantially orthogonal orientation to the locking element.

29. The telephone holder of claim 1 wherein the opening for the locking element is in a side portion of the holder spaced apart and separate from the opening for the pushing element member.

* * * * *